(12) United States Patent
Okafuji et al.

(10) Patent No.: US 9,017,144 B2
(45) Date of Patent: Apr. 28, 2015

(54) METHOD FOR MANUFACTURING ELECTRONIC GRADE SYNTHETIC QUARTZ GLASS SUBSTRATE

(75) Inventors: Daiyu Okafuji, Joetsu (JP); Masaki Takeuchi, Joetsu (JP); Hiroyuki Yamazaki, Joetsu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 468 days.

(21) Appl. No.: 13/170,684

(22) Filed: Jun. 28, 2011

(65) Prior Publication Data

US 2011/0318996 A1 Dec. 29, 2011

(30) Foreign Application Priority Data

Jun. 28, 2010 (JP) ................................ 2010-146507

(51) Int. Cl.
| | | |
|---|---|---|
| B24B 7/24 | (2006.01) | |
| C03C 15/02 | (2006.01) | |
| B24B 19/03 | (2006.01) | |
| B24B 7/22 | (2006.01) | |

(52) U.S. Cl.
CPC ................. *B24B 7/241* (2013.01); *C03C 15/02* (2013.01); *B24B 19/03* (2013.01); *B24B 7/228* (2013.01)

(58) Field of Classification Search
CPC ............ B24B 7/24; B24B 7/241; B24B 7/242
USPC ........... 451/42, 43, 24, 27, 41, 44, 51, 57, 58, 451/61; 216/52, 53
See application file for complete search history.

(56) References Cited

U.S. PATENT DOCUMENTS

| | | | | | |
|---|---|---|---|---|---|
| 4,029,531 | A | * | 6/1977 | Marinelli | 438/749 |
| 4,106,915 | A | * | 8/1978 | Kagawa et al. | 51/296 |
| 4,170,851 | A | * | 10/1979 | Enos | 451/5 |
| 4,928,435 | A | * | 5/1990 | Masaki et al. | 451/159 |
| 6,113,464 | A | * | 9/2000 | Ohmori et al. | 451/41 |
| 6,162,702 | A | * | 12/2000 | Morcom et al. | 438/459 |
| 6,413,682 | B1 | | 7/2002 | Shibano et al. | |
| 7,115,485 | B2 | * | 10/2006 | Priewasser | 438/464 |
| 7,210,984 | B2 | * | 5/2007 | Taylor | 451/44 |
| 7,420,263 | B2 | * | 9/2008 | Park et al. | 257/620 |
| 7,559,826 | B2 | * | 7/2009 | Sekiya | 451/41 |
| 8,292,690 | B2 | * | 10/2012 | Seddon | 451/5 |

(Continued)

FOREIGN PATENT DOCUMENTS

| | | |
|---|---|---|
| CN | 1469459 A | 1/2004 |
| JP | 03-054569 A | 3/1991 |

(Continued)

OTHER PUBLICATIONS

Japanese Office Action dated Feb. 25, 2014, issued in corresponding Japanese application No. 2011-132883 (3 pages).

(Continued)

*Primary Examiner* — Lee D Wilson
*Assistant Examiner* — Tyrone V Hall, Jr.
(74) *Attorney, Agent, or Firm* — Westerman, Hattori, Daniels & Adrian, LLP (57) ABSTRACT

An electronic grade synthetic quartz glass substrate having a recess, channel or step is manufactured by machining at least one surface of a synthetic quartz glass substrate having a maximum birefringence of up to 3 nm/cm in its entirety to form a recess, channel or step, and removing the residual stress due to machining.

15 Claims, 3 Drawing Sheets

(56) References Cited

U.S. PATENT DOCUMENTS

| | | | |
|---|---|---|---|
| 2002/0046580 A1* | 4/2002 | Matsuo et al. | 65/397 |
| 2006/0223427 A1* | 10/2006 | Tsumuraya et al. | 451/61 |
| 2006/0244096 A1* | 11/2006 | Sekiya | 257/510 |
| 2009/0038743 A1* | 2/2009 | Suzuki et al. | 156/154 |
| 2009/0102020 A1* | 4/2009 | Sugawara et al. | 257/618 |
| 2009/0104853 A1* | 4/2009 | Suzuki et al. | 451/44 |
| 2009/0186563 A1* | 7/2009 | Takahashi et al. | 451/57 |
| 2010/0059862 A1 | 3/2010 | Seddon | |
| 2010/0291257 A1 | 11/2010 | Resnick et al. | |

FOREIGN PATENT DOCUMENTS

| | | |
|---|---|---|
| JP | 2000-330263 A | 11/2000 |
| JP | 2001-097734 A | 4/2001 |
| JP | 2008-103512 A | 5/2008 |
| JP | 2009-536591 A | 10/2009 |
| WO | 2010/021297 A1 | 2/2010 |

OTHER PUBLICATIONS

Extended European Search Report dated Oct. 16, 2014, issued in corresponding European Patent Application No. 11171429.1 (5 pages).

Chinese Office Action dated Apr. 28, 2014, issued in corresponding CN application No. 201110259707.0 with English translation (20 pages).

* cited by examiner

METHOD FOR MANUFACTURING ELECTRONIC GRADE SYNTHETIC QUARTZ GLASS SUBSTRATE

CROSS-REFERENCE TO RELATED APPLICATION

This non-provisional application claims priority under 35 U.S.C. §119(a) on Patent Application No. 2010-146507 filed in Japan on Jun. 28, 2010, the entire contents of which are hereby incorporated by reference.

TECHNICAL FIELD

This invention relates to a method for manufacturing electronic grade synthetic quartz glass substrates having a recess, channel or step and more particularly, a method for manufacturing synthetic quartz glass substrates for use in the advanced applications of semiconductor-related electronic materials, typically as photomasks, exposure tool components, reticles and nanoimprint molds.

BACKGROUND ART

The quality of synthetic quartz glass substrates is evaluated in terms of the size and population of defects on the substrate, flatness, surface roughness, photochemical stability of material, and surface chemical stability. The trend toward higher accuracy of the design rule poses ever-tightening requirements on these factors.

Photomask substrates used in the fabrication of microelectronic devices and liquid crystal displays must have a high accuracy of shape or topography. If a substrate has a poor accuracy of shape or a certain degree of distortion, exposure through the mask entails a focal shift on a silicon wafer to aggravate pattern uniformity, failing to form a fine feature pattern. In the lithography using ArF laser light source of 193 nm wavelength which is the current mainstream of microelectronic lithography and the EUV lithography using a light source of 13.5 nm wavelength in the soft x-ray wavelength range on which development efforts are made as the next generation lithography, glass substrates for photomasks and reflection masks are required to have a high level of topographical factors including flatness, parallelism, and contour tolerance (as to flatness, see JP-A 2008-103512). The same applies to photomask substrates on the array side of TFT liquid crystal panels and photomask substrates for color filters.

Research works have also been made on the nanoimprint lithography (NIL) which is a low cost, simple, high resolution process as compared with the conventional exposure processes. The NIL also needs a substrate having a high accuracy of shape as the imprint mold. The NIL is a technique of imprinting a nano-structured pattern to a resin for pattern transfer. The resolution of the pattern to be transferred depends on the resolution of nano-structures on the mold. Then the substrate on which a fine feature pattern is formed is required to have a high accuracy of shape (see JP-A H03-54569).

Besides, the synthetic quartz glass members to be assembled in exposure tools and various other equipment used in the processes of manufacturing microelectronic and display components are also required to have a high purity and accuracy.

CITATION LIST

Patent Document 1: JP-A 2008-103512
Patent Document 2: JP-A H03-54569
Patent Document 3: JP-A 2009-536591

SUMMARY OF INVENTION

An object of the invention is to provide a method for manufacturing an electronic grade synthetic quartz glass substrate having a recess, channel or step in a relatively simple manner, in which shape factors including size, bottom wall thickness, and parallelism are consistently controlled at a high accuracy so that the substrate may experience a minimized change of shape in its entirety before and after working.

The inventors have found that the above problems are overcome by machining a synthetic quartz glass substrate to form a recess, channel or step therein and polishing the machined surfaces, specifically the bottom and side surfaces of the recess, channel or step to mirror finish or wet etching the substrate with a glass etching solution until a work affected layer is removed, for thereby removing the residual stress due to machining.

It is assumed that a substrate has a pair of front and back major surfaces, and a recess, channel or step formed in at least one surface has bottom and side surfaces or walls. On use of the substrate having a recess, channel or step, the photomask or nanoimprint working process is applied to the front surface. If the substrate surface experiences substantial changes of flatness and parallelism before and after working of the recess, channel or step, the substrate must be resurfaced. If the substrate whose surface has experienced substantial changes of flatness and parallelism is used in the photomask or NIL application without readjustment, there is a risk of a focal shift occurring upon exposure or a pattern shift occurring upon transfer.

The inventors have found that an electronic grade synthetic quartz glass substrate having a high accuracy of shape factor can be manufactured by providing a glass substrate having a maximum birefringence of up to 3 nm/cm, preferably a surface flatness of up to 0.5 µm and a parallelism of up to 10 µm as the starting substrate, machining the substrate to form a recess, channel or step therein, and removing the residual stress due to machining. The resulting glass substrate has a high accuracy of shape factor before and after machining, specifically the substrate surface experiences a change of flatness of up to 0.1 µm and a change of parallelism of up to 0.3 µm before and after machining. If little or no residual stress is removed, the substrate surface experiences changes of flatness and parallelism outside the ranges.

In one aspect, the invention provides a method for manufacturing an electronic grade synthetic quartz glass substrate having a recess, channel or step, comprising the steps of providing a synthetic quartz glass substrate having a maximum birefringence of up to 3 nm/cm in its entirety, machining at least one surface of the substrate to form a recess, channel or step therein, and removing the residual stress due to machining.

In one preferred embodiment, the stress removing step includes mirror finish polishing the machined surface to remove a work affected layer in the machined surface.

More preferably, the mirror finish polishing step includes polishing the bottom and side surfaces of the recess, channel or step to mirror finish by a working portion of a rotary polishing tool while keeping the working portion in contact with the bottom and side surfaces under independent constant pressures.

More preferably, the mirror finish polishing step includes polishing the recess, channel or step to mirror finish by a working portion of a rotary polishing tool while keeping the working portion in contact with the recess, channel or step under a pressure of 1 to 1,000,000 Pa.

More preferably, the mirror finish polishing step includes polishing the bottom and side surfaces of the recess, channel or step to mirror finish by a working portion of a rotary polishing tool while keeping the working portion in concurrent contact with the bottom and side surfaces under independent constant pressures.

More preferably, in the mirror finish polishing step, the rotary polishing tool and the substrate are relatively moved such that the working portion may follow the profile of the recess, channel or step in the substrate.

More preferably, in the mirror finish polishing step, the rotary polishing tool is rotated about the recess or a substrate-holding platform is rotated such that the working portion may follow the profile of the recess, channel or step in the substrate.

More preferably, in the mirror finish polishing step, the rotary polishing tool or a substrate-holding platform is moved along at least one straight axis such that the working portion may follow the profile of the recess, channel or step in the substrate.

In another preferred embodiment, the stress removing step includes wet etching the glass substrate with a glass etching solution to remove a work affected layer in the machined surface. The glass etching solution is typically an aqueous solution containing hydrofluoric acid or a fluoride.

Preferably, the substrate on its front surface has a flatness of 0.01 to 0.5 µm and a parallelism of up to 10 µm, and the substrate on its surface experiences a change of flatness of up to 0.1 µm and a change of parallelism of up to 0.3 µm before and after formation of the recess, channel or step.

Typically the glass substrate is used as a photomask, exposure tool component, reticle or nanoimprint component.

ADVANTAGEOUS EFFECTS OF INVENTION

In the manufacture of an electronic grade synthetic quartz glass substrate having a recess, channel or step, for example, a synthetic quartz glass substrate for use as a photomask substrate in the photolithography or a mold substrate in the nanoimprint lithography (NIL) for the fabrication of IC and other electronic devices, the method of the invention is able to produce a glass substrate having a high accuracy of shape factor in a relatively simple manner by providing a glass substrate having a maximum birefringence within a certain range in its entirety, machining the substrate to form a recess, channel or step therein, and removing the residual stress due to machining, specifically by mirror finish polishing or wet etching to remove a work affected layer in the machined surface. The substrate as a whole experiences a minimized change of shape factor before and after formation of the recess, channel or step.

DESCRIPTION OF EMBODIMENTS

In the following description, like reference characters designate like or corresponding parts throughout the several views shown in the figures. The singular forms "a", "an" and "the" include plural referents unless the context clearly dictates otherwise. It is also understood that terms such as "front," "back," and the like are words of convenience and are not to be construed as limiting terms. The term "recess" refers to a bore which does not penetrate throughout the substrate in its thickness direction, that is, terminates midway with a bottom wall left while the bore may be of circular, elliptic or rectangular shape in cross section.

According to the method of the invention, an electronic grade synthetic quartz glass substrate is manufactured by providing a synthetic quartz glass substrate having a maximum birefringence of up to 3 nm/cm in its entirety, machining the substrate to form a recess, channel or step at a predetermined position, and removing the residual stress due to machining.

The starting synthetic quartz glass substrate has a maximum birefringence of up to 3 nm/cm, preferably up to 2 nm/cm, and more preferably up to 1 nm/cm in its entirety. Such a low birefringence indicates that the internal stress strain of the substrate is minimized, which enables to restrain the shape change of the overall substrate before and after formation of the recess, channel or step. It is noted that the maximum birefringence is determined by measuring the birefringence of a substrate over its entirety by a birefringence meter ABR-10A by UNIOPT Corp., and selecting the maximum of the measurements.

In a preferred embodiment, the starting synthetic quartz glass substrate has a maximum birefringence of up to 2 nm/cm, more preferably up to 1 nm/cm, and even more preferably up to 0.5 nm/cm in a region where the recess, channel or step is to be worked. The reduced birefringence of the working region of the substrate indicates that the stress strain of the working region is minimized, which enables to suppress any shape change on the front surface of the substrate (opposed to the back surface where the recess, channel or step is worked) before and after working.

The starting synthetic quartz glass substrate having a maximum birefringence of up to 3 nm/cm may be one prepared by any well-known techniques. If desired, the substrate may have a chromium or similar film deposited on its surface or a nano-structured pattern formed on its surface. The birefringence may be reduced, for example, by slowly cooling synthetic quartz glass from 1,200° C. to 800° C. The slow cooling may be carried out at the same time as the process of shaping a synthetic quartz glass ingot to the desired geometry. Alternatively, slow cooling may be carried out in air or an oxygen-containing atmosphere after shaping and annealing of synthetic quartz glass.

The shape of the synthetic quartz glass substrate may be rectangular or circular. The size of the synthetic quartz glass substrate may vary over a wide range covering from small-size substrates for IC photomasks or NIL molds to large-size photomask substrates for large-size liquid crystal displays. For example, rectangular shape glass substrates may range from a size of 20 mm×20 mm to a size of 152 mm×152 mm, and even to a size of 1,000 mm×2,000 mm. For circular shape glass substrates, a wafer size having a diameter of 6 inches or 8 inches is preferably used.

Although the thickness of the substrate between the front and back surfaces may vary over a wide range, the substrate thickness is preferably 0.1 to 300 mm, more preferably 0.1 to 100 mm, and even more preferably 0.2 to 30 mm.

If necessary and preferably, the synthetic quartz glass substrate is previously measured for flatness and parallelism for confirming the dimensional accuracy thereof. Measurement of flatness is preferably conducted, from the standpoint of measurement accuracy, by the optical interference method of directing coherent light, typically laser light to a substrate surface where it is reflected so that a difference in height of the substrate surface is observed as a phase shift of reflected light. Flatness may be measured using an interferometer Zygo Mark IVxp by Zygo Corporation or Ultra Flat M200 by TROPEL, for example. Parallelism may also be measured by Zygo Mark IVxp by Zygo Corporation.

Figure 1:
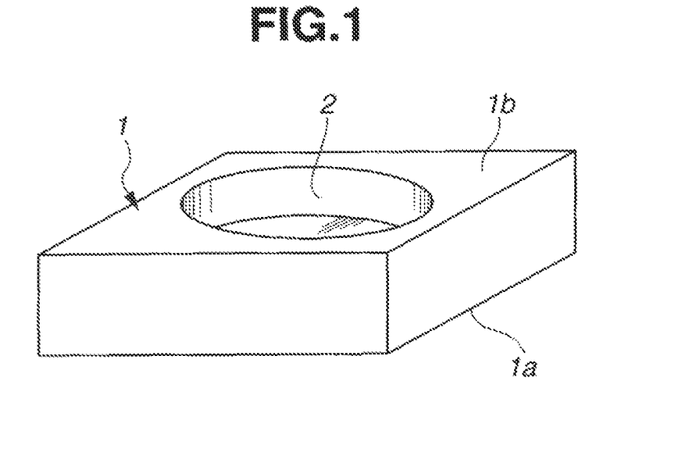
FIGS. 1 and 2 are perspective and cross-sectional views of a synthetic quartz glass substrate having a recess in one embodiment of the invention, respectively.
Figure 2:
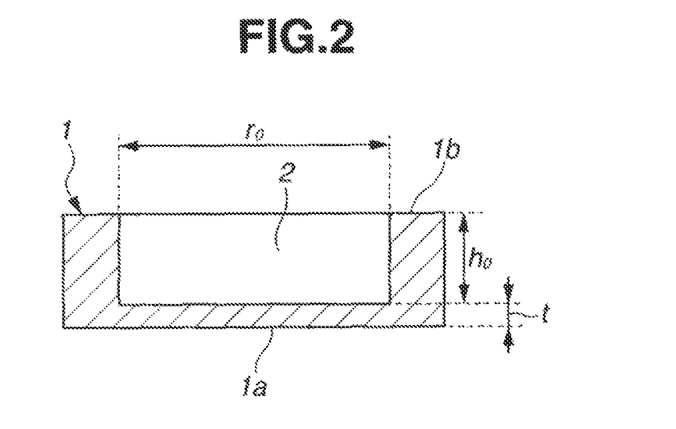
Figure 3:
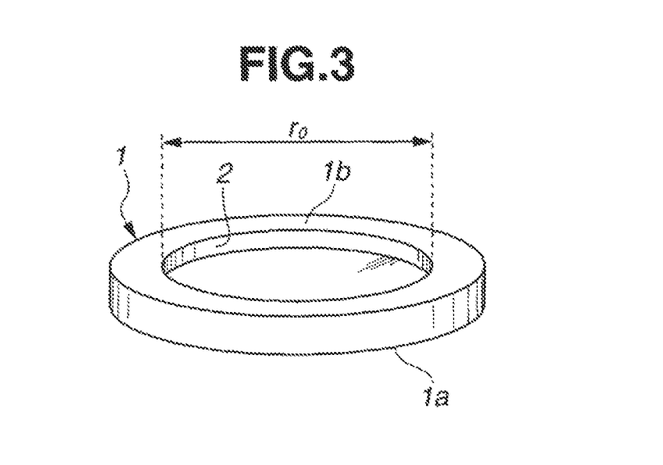
FIG. 3 is a perspective view of a synthetic quartz glass substrate having a recess in another embodiment of the invention.
Figure 4:
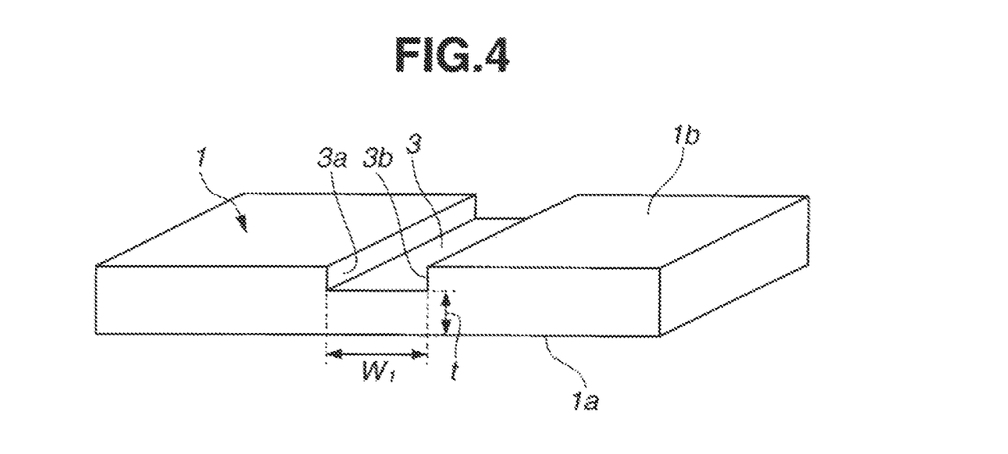
FIG. 4 is a perspective view of a synthetic quartz glass substrate having a channel in another embodiment of the invention.

The invention relates to a method for manufacturing an electronic grade synthetic quartz glass substrate wherein the glass substrate is provided with a recess as shown in FIGS. 1 and 2, a channel as shown in FIG. 3, or steps as shown in FIG. 4, depending on a particular application and the structure of an exposure or NIL equipment in which it is incorporated. In FIGS. 1 to 4, a synthetic quartz glass substrate 1 has a front surface 1a and a back surface 1b. The substrate 1 is provided in its back surface 1b with a recess 2 having a bottom surface and a side surface (FIGS. 1 and 2), a channel 3 having a bottom surface and side surfaces (FIG. 3), or steps 4 each having a bottom surface and a side surface (FIG. 4). The portion of the substrate which is left after the recess, channel or step is formed (as best shown in the cross-sectional view of FIG. 2) is referred to as "bottom wall."

More specifically, in FIGS. 1 and 2, a recess 2 is formed at the center of a rectangular substrate 1. In FIG. 3, a recess 2 is formed at the center of a circular substrate. In this case, the recess 2 is often formed in the back surface 1b of the substrate 1, and the photomask or nanoimprint working process is applied to the front surface 1a of the substrate 1.

In FIG. 4, a channel 3 is formed along the width direction at the center portion of the back surface 1b of the rectangular substrate 1.

Figure 5:
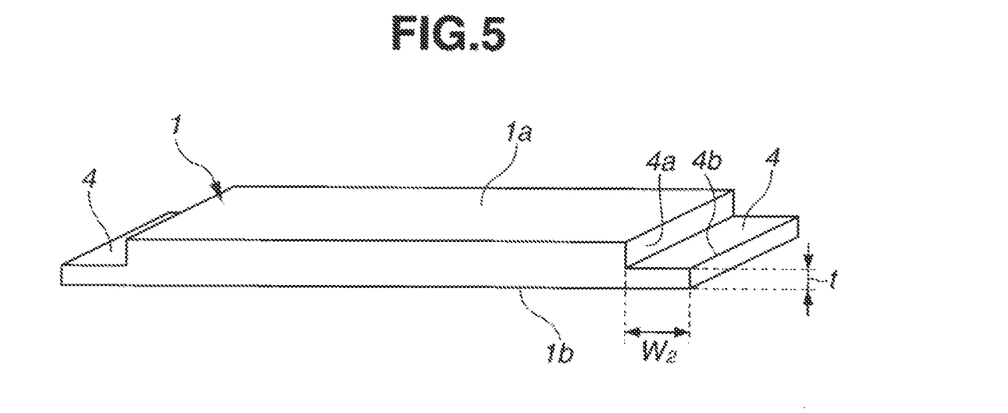
FIG. 5 is a perspective view of a synthetic quartz glass substrate having steps in a further embodiment of the invention.
Figure 6:
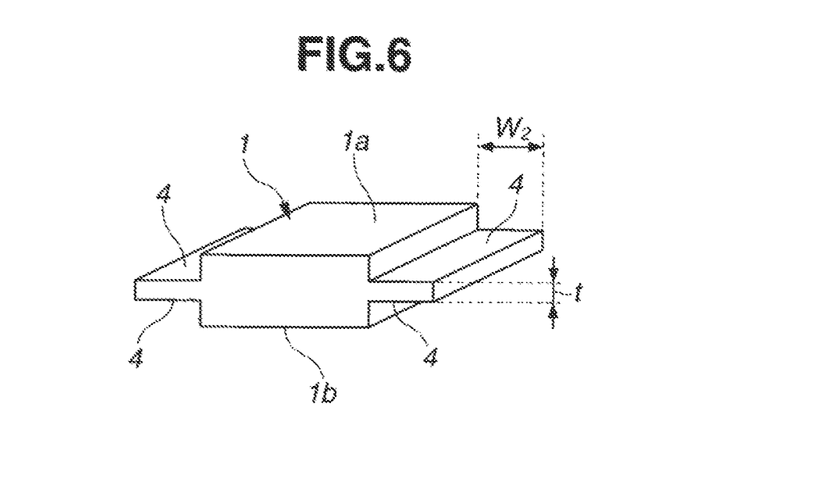
FIG. 6 is a perspective view of a synthetic quartz glass substrate having steps in another embodiment of the invention.
Figure 7:
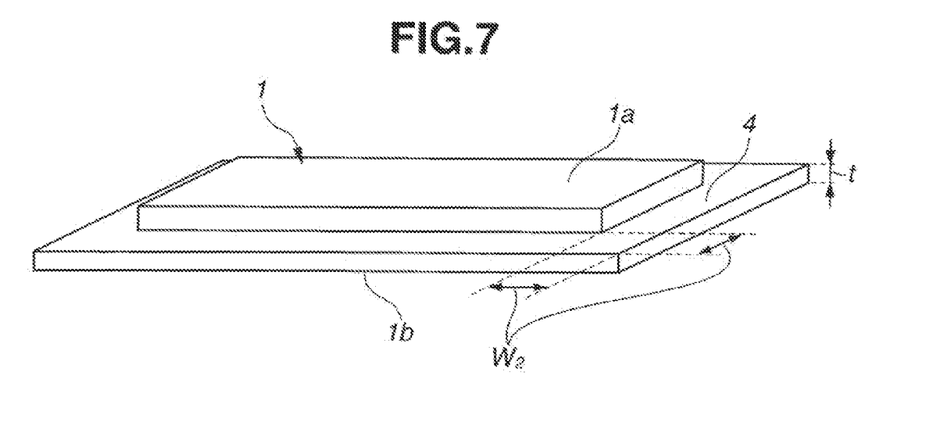
FIG. 7 is a perspective view of a synthetic quartz glass substrate having a step in a further embodiment of the invention.
Figure 8:
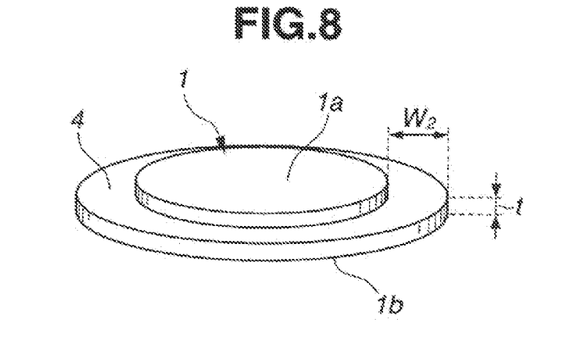
FIG. 8 is a perspective view of a synthetic quartz glass substrate having a step in a still further embodiment of the invention.

In FIG. 5, steps 4 are formed at both end portions of the front surface 1a of the rectangular substrate 1. The steps may be formed in the back surface 1b of the substrate 1, and the steps 4 also may be formed at both end portions of the front surface 1a and the back surface 1b of the substrate, as shown in FIG. 6. The step 4 may be formed along the whole peripheral edge, as shown in FIGS. 7 and 8. In FIG. 7, the step 4 is formed in the periphery of the rectangular substrate 1. In FIG. 8, the step 4 is formed in the periphery of the circular substrate 1. The step 4 is formed in the front surface 1a of the substrate 1 in FIGS. 7 and 8, although the step may be formed in the back surface of the substrate.

At least two of the recess, channel and step may be formed in one surface of the substrate. Any one of the recess, channel and step may be formed in one surface of the substrate, and the different one is formed in another surface of the substrate.

The shape of the recess may be circular, elliptic, oval, square or multilateral in plain view, although the shape of the recess is preferably circular as is shown in FIGS. 2 and 3. The size of the recess, more specifically the diameter in case of the circular recess, the major axis in case of the elliptic or oval recess, and the diagonal length in case of the square or multilateral recess, is preferably in a range of 5 to 200 mm. The channel is preferably formed so that the both side walls 3a and 3b are parallel each other and are plain, although the both side walls may not be parallel or one or both of the side walls 3a and 3b may be a projectively or retractively curved surface. The step is preferably formed so that the inside wall 4a is parallel to the end surface of the substrate including the free outer edge 4b of the step 4 and is plain, although the inside wall 4a may not be parallel to the above-said end surface or may be a projectively or retractively curved surface. The width (the longest width) is preferably in a range of 5 to 200 mm.

The depth of recess 2, channel 3 and step 4 may be selected as appropriate depending on a particular application. It is preferred for strength that the thickness ("t" in FIGS. 2, 3 and 4) of the bottom wall be 0.05 to 80 mm, more preferably 0.05 to 29 mm, and even more preferably 0.05 to 11 mm, and correspond to 1 to 90%, more preferably 5 to 50%, and even more preferably 10 to 30% of the thickness of substrate 1.

In the event the substrate is used in the NIL, the recess 2 or channel 3 is formed in the back surface 1b of substrate 1 while the front surface 1a of substrate 1 opposed to the back surface 1b is provided with a nano-structured pattern for nano-imprinting. The steps 4 are formed in the front surface and/or the back surface while the front surface is provided with a nano-structured pattern for nano-imprinting.

In the first step of machining a synthetic quartz glass substrate to form a recess, channel or step therein, a machining center or numerically controlled machine tool may be used. A grinding wheel is rotated and moved on a substrate surface to be worked under conditions that may not cause any crack, flaw or chips whereby a recess, channel or step of predetermined size and depth is formed.

Specifically, a grinding wheel having diamond or CBN abrasives electroplated or metal bonded is used and operated at a spindle rotational frequency of 100 to 30,000 rpm, preferably 1,000 to 15,000 rpm and a cutting speed of 1 to 10,000 mm/min, preferably 10 to 1,000 mm/min.

According to the invention, the residual stress due to the machining step is then removed. The residual stress due to machining may be removed by either mirror finish polishing or wet etching. Specifically, the machined surface may be polished to mirror finish or the substrate may be wet etched with a glass etching solution to thereby remove a work affected layer in the machined surface.

The step of polishing the machined surface, that is, the bottom and side surfaces of the recess, channel or step to mirror finish is carried out by contacting a working portion of a rotary polishing tool with the bottom and side surfaces under independent constant pressures and relatively moving the tool at a constant speed. By polishing at a constant pressure and a constant speed, the machined surface can be uniformly polished at a constant polishing rate. Specifically, the pressure under which a working portion of a rotary polishing tool is kept in contact with the machined surface is preferably in a range of 1 to 1,000,000 Pa, more preferably 1,000 to 100,000 Pa, from the standpoints of economy and ease of control.

Also from the standpoints of economy and ease of control, the polishing speed is preferably in a range of 1 to 10,000 mm/min, more preferably 10 to 1,000 mm/min. The moving quantity may be determined in accordance with the shape and size of the glass substrate.

The rotary polishing tool may be of any type as long as its working portion is an abrasive rotary component. Examples include a spindle having a tool chucking portion or a precision grinder having a polishing tool mounted thereon (e.g., Leutor).

The type of material used in the polishing tool is not particularly limited as long as the working portion is a green silicon carbide (GC) wheel, white fused alumina (WA) wheel, diamond wheel, cerium wheel, cerium pad, rubber wheel, felt buff, polyurethane or other component capable of working and removing workpiece stock.

Figure 9:
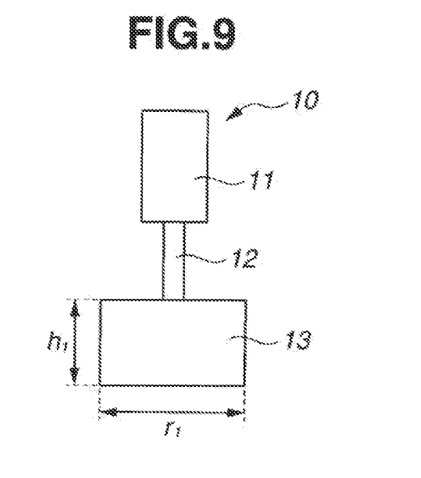
FIG. 9 is a schematic view of one exemplary rotary polishing tool.

The working portion of the rotary polishing tool may have any shape including circular or doughnut flat plate, cylinder, bombshell, disk and barrel shapes. For example, FIG. 5 shows an exemplary polishing tool 10 comprising a piston 11, a rotating shaft 12 received for axial motion in the piston 11 and rotated by a rotational drive, typically motor, and a working portion 13 attached to the end of the shaft. In order to polish the bottom and side surfaces of the recess, channel or step at the same time, the height ($h_1$ in FIG. 5) of the working portion 13 in contact with the side surface should preferably be equal to or more than the height ($h_0$ in FIG. 2) of the side surface. Likewise, the diameter ($r_1$ in FIG. 9) of the working portion 13 should preferably be equal to or more than half of the diameter ($r_0$ in FIG. 2) of the recess (i.e., $r_1 \geq r_0/2$) if the recess is circular, or half of the minor diameter of the recess if the recess is elliptic or oval. The diameter $r_1$ is preferably equal to or more than half of the width ($W_1$ in FIG. 3) in case of the channel (i.e., $r_1 \geq W_1/2$). The diameter $r_1$ is preferably equal to or more than the width ($W_2$ in FIG. 4) in case of the step (i.e., $r_1 \geq W_2$).

When the recess, channel or step is polished by the rotary polishing tool with its working portion in contact with the machined surfaces (bottom and side surfaces), a polishing abrasive slurry is preferably delivered to the polishing site. Examples of suitable abrasive grains used herein include silica, ceria, Alundum, white Alundum (WA), emery, zirconia, SiC, diamond, titania, and germania. The grain size is preferably in a range of 10 nm to 10 μm. A water slurry of such abrasives may be used.

The relative moving speed of the rotary polishing tool is not particularly limited although it is preferably selected in the range of 1 to 10,000 mm/min, more preferably 10 to 1,000 mm/min. The rotational frequency of the working portion of the rotary polishing tool is preferably in the range of 100 to 10,000 rpm, more preferably 1,000 to 8,000 rpm, and even more preferably 2,000 to 7,000 rpm. A lower rotational frequency may lead to a lower polishing rate, taking a too long time until the machined surface is mirror finished. A higher rotational frequency may lead to a higher polishing rate or excessive abrasion of the working portion, causing difficult control of mirror finishing.

When the bottom and side surfaces of the recess, channel or step are polished to mirror finish according to the inventive method, independent pressure control mechanisms may be used for keeping the working portion of the rotary polishing tool in contact with the bottom and side surfaces under independent constant pressures. The pressure control mechanism used herein may be a pneumatic piston or load cell. In the case of the rotary polishing tool of FIG. 9, for example, the pressure of contact between the working portion and the bottom surface can be adjusted by adjusting the pressure of the pneumatic piston 11. Also, in the case of the rotary polishing tool of FIG. 9, a second piston may be coupled to the pneumatic piston 11 for moving the piston 11 toward and away from the side surface of the recess, channel or step. Then the pressure of contact between the working portion and the side surface can be adjusted by adjusting the pressure of the second piston. An alternative system for adjusting the pressure of contact between the working portion and the side surface includes another piston having a shaft and a substrate-holding platform for holding the substrate, with the shaft of the other piston being coupled to the platform, whereby the pressure of the shaft is adjusted to adjust a lateral pressure for controlling the motion of the substrate-holding platform. By using a single rotary polishing tool and independent pressure control mechanisms to the bottom and side surfaces, bringing the working portion in contact with the bottom and side surfaces under independent constant pressures, and relatively moving the tool at a constant speed, the bottom and side surfaces can be concurrently polished uniformly at independent polishing rates.

It may be contemplated that the bottom and side surfaces of the recess, channel or step are polished separately in succession rather than concurrently. However, this procedure is less desired in that since the working portion of the rotary polishing tool in contact with the bottom or side surface can come in contact with the side or bottom surface at the same time, the polishing of these surfaces becomes non-uniform, and a longer polishing time is necessary.

According to one embodiment of the method of the invention, in the step of polishing the bottom and side surfaces to mirror finish, the rotary polishing tool and the substrate are relatively moved such that the working portion may follow the profile of the recess, channel or step in the substrate. The mode of movement may be of any type as long as it can control the quantity, direction and speed of movement constant. For example, a multi-axis robot may be used.

The rotary polishing tool and the substrate may be relatively moved by rotating the rotary polishing tool about the recess or rotating the substrate or by moving the rotary polishing tool or the substrate along at least one straight axis, such that the working portion may follow the profile of the recess, channel or step.

In the embodiment wherein the surfaces of the recess, channel or step are polished to mirror finish by rotating the rotary polishing tool about the recess or rotating the substrate such that the working portion may follow the profile of the recess, channel or step, any mechanism capable of controlling the rotational frequency and speed constant may be used. For example, a motor spindle is used to rotate the rotary polishing tool or a substrate-holding platform at a frequency of 0.1 to 10,000 rpm, especially 1 to 100 rpm, and a speed of 1 to 10,000 mm/min, especially 10 to 1,000 mm/min. This embodiment is useful particularly when the bottom and side surfaces of a circular, elliptic or curved surface-like recess, channel or step are uniformly polished at independent constant pressures and constant speeds to mirror finish.

In the other embodiment wherein the surfaces of the recess, channel or step are polished to mirror finish by moving the rotary polishing tool or the substrate along at least one straight axis such that the working portion may follow the profile of the recess, channel or step, any mechanism capable of controlling the quantity and speed of movement constant. For example, a servo motor is used to move the rotary polishing tool or a substrate-holding platform on a slider at a speed of 1 to 10,000 mm/min, especially 10 to 1,000 mm/min. This embodiment is useful particularly when the bottom and side surfaces of a rectangular or plain surface-like recess, channel or step are uniformly polished at constant pressures and constant speeds to mirror finish.

In another preferred embodiment, the glass substrate as machined is wet etched with a glass etching solution. The glass etching solution is typically an aqueous solution containing hydrofluoric acid or a fluoride in a concentration of 1 to 60% by weight, more preferably 20 to 50% by weight, in which the glass substrate is immersed. Suitable fluorides include sodium fluoride and ammonium fluoride. The wet etching may be improved in uniformity and stability by using a mixed aqueous solution containing hydrofluoric acid and a fluoride or by adding a surfactant to the glass etching solution.

The etching temperature and time widely vary with a concentration of the glass etching solution. Usually the etching temperature is 10 to 80° C., preferably 20 to 40° C., and the etching time is 10 seconds to 10 hours, preferably 30 seconds to 5 hours.

It is noted that the amount (or thickness) of material removal by mirror finish polishing or wet etching may be set effective to remove the residual stress or the work affected layer and is preferably 0.01 to 5 µm, more preferably 0.1 to 3 µm.

After mirror finish polishing to remove the work affected layer, the bottom and side surfaces of the recess, channel or step preferably have a surface roughness Ra of up to 1 nm, more preferably up to 0.5 nm. If the bottom and side surfaces of the recess, channel or step are not mirror finished, little light may be transmitted leading to exposure failure, or contaminants may deposit thereon to obstruct transmittance of light or detrimentally affect the pattern. It is noted that the surface roughness Ra is determined according to JIS B-0601.

Before and after working of the recess, channel or step in the glass substrate, the front surface of the glass substrate experiences a change of flatness of preferably up to 0.1 µm, more preferably up to 0.05 µm, and even more preferably up to 0.02 µm. A substantial change of flatness the substrate front surface experiences indicates that when a recess, channel or step is worked in the starting synthetic quartz glass substrate whose front surface has been precision polished to a better flatness, the flatness of the substrate front surface may be substantially worsened after working.

From the standpoint of pattern uniformity, the front surface of the glass substrate preferably has a flatness of 0.01 to 0.5 µm, more preferably 0.01 to 0.3 µm, and even more preferably 0.01 to 0.1 µm. If the flatness of the front surface is poor, there may occur a focal shift upon exposure or a pattern shift upon transfer when a photomask pattern or transfer nano-structured pattern is formed on the front surface.

Before and after working of the recess, channel or step in the glass substrate, the back surface of the glass substrate excluding the region of recess, channel or step experiences a change of flatness of preferably up to 0.1 µm, more preferably up to 0.05 µm, and even more preferably up to 0.02 µm. A substantial change of flatness the substrate back surface experiences indicates that when a recess, channel or step is worked in the starting synthetic quartz glass substrate whose surface has been precision polished to a better flatness, the flatness of the substrate back surface excluding the region of recess, channel or step may be substantially worsened after working.

From the standpoint of substrate clamping, the back surface of the glass substrate excluding the region of recess, channel or step should preferably have a flatness of 0.01 to 1.0 µm, more preferably 0.01 to 0.5 µm, and even more preferably 0.01 to 0.1 µm. A poor flatness of the back surface suggests a risk that when the substrate is mounted in an exposure or patterning apparatus by vacuum chucking or clamping the portion of the substrate back surface excluding the region of recess, channel or step, the substrate cannot be clamped because of air leakage or unstable clamp pressure, or if possible, the substrate cannot be held accurately parallel to the reference.

It is preferred from the aspect of clamping the substrate that the bottom surface of the recess, channel or step which has been polished to mirror finish have a flatness of 0.01 to 40 µm, more preferably 0.01 to 10 µm, and even more preferably 0.01 to 5 µm. A poor flatness outside the range may make it difficult to hold the substrate accurately parallel to the reference when the substrate is mounted in an exposure or patterning apparatus by clamping the substrate at the bottom surface of the recess, channel or step. A poor flatness also has the problem that a fluid (gas or liquid) may not flow smoothly when the fluid is fed in or out through the recess, channel or step.

It is preferred from the standpoint of a pattern shift that the parallelism between the substrate front surface and the bottom surface of the recess, channel or step be up to 100 µm, more preferably up to 50 µm, and even more preferably up to 10 µm. If the parallelism is poor, it may become difficult to deform the substrate symmetrically when a resin is imprinted by deforming the substrate at the recess, channel or step and also to hold the substrate accurately parallel to the reference when the substrate is mounted in an exposure or patterning apparatus by clamping the substrate at the bottom surface of the recess, channel or step, leaving the risk of a focal shift or pattern shift.

The parallelism between the substrate front surface and the back surface excluding the region of recess, channel or step should preferably experience a change of up to 0.3 µm, more preferably up to 0.2 µm, and even more preferably up to 0.1 µm before and after formation of the recess, channel or step. A substantial change of parallelism indicates that when a recess, channel or step is worked in the starting synthetic quartz glass substrate whose surface has been precision polished to a better parallelism, the parallelism of the substrate may be substantially worsened after working.

It is preferred from the standpoint of a pattern shift that the parallelism between the substrate front surface and the back surface excluding the region of recess, channel or step be up to 5 µm, more preferably up to 3 µm, and even more preferably up to 1 µm. If this parallelism is poor, it may become difficult to hold the substrate accurately parallel to the reference when the substrate is mounted in an exposure or patterning apparatus by vacuum chucking the substrate back surface, leaving the risk of a focal shift or pattern shift.

EXAMPLE

Examples of the invention are given below by way of illustration and not by way of limitation. It is noted that flatness and parallelism were measured by Zygo Mark IVxp by Zygo, and surface roughness Ra measured by atomic force microscopy.

Example 1

A synthetic quartz glass substrate dimensioned 100 mm×100 mm×6.35 mm (thick) having front, back and end surfaces polished to mirror finish was prepared as a starting substrate. The starting substrate had a maximum birefringence of 0.93 nm/cm in its entirety, the front surface of the substrate in a central region of 90 mm×90 mm had a flatness of 0.091 µm, the back surface in a region excluding a center circle with a diameter of 70 mm had a lo flatness of 0.121 µm, and the substrate excluding a center circle with a diameter of 70 mm had a parallelism of 0.3 µm. Using a machining center and a diamond abrasive wheel, the starting substrate was machined at the center of its back surface to form a circular recess having a depth of 5.32 mm and a diameter of 69.98 mm.

Next, the machined substrate was fixedly mounted on a platform. A wool felt buff having a diameter of 50 mm and a height of 30 mm adapted to rotate at 1,000 rpm was forced in contact with the bottom surface of the recess under 3,500 Pa and the side surface under 2,000 Pa. The substrate-holding platform was rotated at 10 rpm, whereby the surfaces were polished for 60 minutes to mirror finish. The recess in the glass substrate as polished had a depth of 5.35 mm with a bottom wall thickness of 1.00 mm, and a diameter of 70 mm.

After polishing, the front surface of the substrate in a central region of 90 mm×90 mm had a flatness of 0.081 µm, the back surface in a region excluding a center circle with a diameter of 70 mm had a flatness of 0.105 µm, and the substrate excluding a center circle with a diameter of 70 mm had a parallelism of 0.3 µm. The front surface experienced a change of flatness of 0.010 µm, the back surface experienced a change of flatness of 0.016 µm, and the substrate experienced a change of parallelism of 0 µm (below the detection limit). The bottom surface of the recess with a diameter of 70 mm had a flatness of 2 µm and a parallelism of 9 µm. The bottom and side surfaces of the recess had a surface roughness Ra of up to 0.25 nm. The minimized changes of flatness and parallelism on the substrate surface proved full removal of the residual stress due to machining.

Example 2

A synthetic quartz glass substrate dimensioned 152 mm×152 mm×6.35 mm (thick) having front, back and end surfaces polished to mirror finish was prepared as a starting substrate. The starting substrate had a maximum birefringence of 1.53 nm/cm in its entirety, the front surface of the substrate in a central region of 142 mm×142 mm had a flatness of 0.235 µm, the back surface in a region excluding a central region of 152 mm×30 mm had a flatness of 0.481 µm, and the substrate excluding a central region of 142 mm×30 mm had a parallelism of 0.9 µm. Using a machining center and a diamond abrasive wheel, the starting substrate was machined at the center of its back surface to form a channel having a depth of 4.98 mm, a width of 29.98 mm and a length of 152 mm, extending parallel to the end surface.

Next, the machined substrate was fixedly mounted on a platform. A wool felt buff having a diameter of 30 mm and a height of 30 mm adapted to rotate at 1,000 rpm was forced in contact with the bottom surface of the channel under 2,000 Pa and one side wall under 2,000 Pa. The substrate-holding platform was moved back and forth at 50 mm/min over 5 strokes. With the buff forced in contact with the bottom surface and the other side wall under the same pressure, the substrate-holding platform was moved back and forth at 50 mm/min over 5 strokes. In this way, the surfaces were polished to mirror finish. The channel in the glass substrate as polished had a depth of 4.00 mm, with a bottom wall thickness of 2.35 mm, and a width of 30 mm.

After polishing, the front surface of the substrate in a central region of 142 mm×142 mm had a flatness of 0.249 µm, the back surface in a region excluding a central region of 142 mm×30 mm had a flatness of 0.503 µm, and the substrate excluding a central region of 152 mm×30 mm had a parallelism of 0.9 µm. The front surface experienced a change of flatness of 0.014 µm, the back surface experienced a change of flatness of 0.022 µm, and the substrate experienced a change of parallelism of 0 µm (below the detection limit). The bottom surface of the channel of 152 mm×30 mm had a flatness of 3 µm and a parallelism of 15 µm. The bottom and side surfaces of the channel had a surface roughness Ra of up to 0.21 nm. The minimized changes of flatness and parallelism on the substrate surface proved full removal of the residual stress due to machining.

Example 3

A synthetic quartz glass substrate dimensioned 200 mm×400 mm×10 mm (thick) having front, back and end surfaces polished to mirror finish was prepared as a starting substrate. The starting substrate had a maximum birefringence of 2.43 nm/cm in its entirety, the front surface of the substrate in a central region of 190 mm×390 mm had a flatness of 2.303 µm, the back surface in a central region of 190 mm×360 mm had a flatness of 3.145 µm, and the substrate in a central region of 190 mm×360 mm had a parallelism of 5.3 µm. Using a machining center and a diamond abrasive wheel, the starting substrate was machined on its back surface along both ends to form steps having a depth of 6.95 mm, a width of 19.99 mm and a length of 200 mm, extending parallel to the end surface.

Next, the machined substrate was fixedly mounted on a platform. A wool felt buff having a diameter of 30 mm and a height of 30 mm adapted to rotate at 1,000 rpm was forced in contact with the bottom surface of the step under 2,000 Pa and the side wall under 2,000 Pa. The substrate-holding platform was moved back and forth at 200 mm/min over 5 strokes. In this way, the surfaces of both side steps were polished to mirror finish. The step in the glass substrate as polished had a depth of 7.00 mm, with a bottom wall thickness of 3.00 mm, and a width of 20 mm.

After polishing, the front surface of the substrate in a central region of 190 mm×390 mm had a flatness of 2.409 µm, the back surface in a central region of 190 mm×390 mm had a flatness of 3.233 µm, and the substrate in a central region of 190 mm×390 mm had a parallelism of 5.5 µm. The front surface experienced a change of flatness of 0.106 µm, the back surface experienced a change of flatness of 0.088 µm, and the substrate experienced a change of parallelism of 0.2 µm. The bottom surfaces of two steps of 200 mm×20 mm had a flatness of 10 µm and 9 µm and a parallelism of 21 µm and 19 µm, respectively. The bottom and side surfaces of the steps had a surface roughness Ra of up to 0.28 nm. The minimized changes of flatness and parallelism on the substrate surface proved full removal of the residual stress due to machining.

Example 4

A synthetic quartz glass substrate dimensioned 100 mm×100 mm×6.35 mm (thick) having front, back and end surfaces polished to mirror finish was prepared as a starting substrate. The starting substrate had a maximum birefringence of 1.43 nm/cm in its entirety, the front surface of the substrate in a central region of 90 mm×90 mm had a flatness of 0.115 µm, the back surface in a region excluding a center circle with a diameter of 70 mm had a flatness of 0.191 µm, and the substrate excluding a center circle with a diameter of 70 mm had a parallelism of 0.3 µm. Using a machining center and a diamond abrasive wheel, the starting substrate was machined at the center of its back surface to form a circular recess having a depth of 5.34 mm and a diameter of 69.98 mm.

Next, the machined substrate was immersed in a 10 wt % hydrofluoric acid aqueous solution at room temperature for 1 hour for etching. The recess in the glass substrate as etched had a depth of 5.35 mm with a bottom wall thickness of 1.00 mm, and a diameter of 70 mm.

After etching, the front surface of the substrate in a central region of 90 mm×90 mm had a flatness of 0.131 μm, the back surface in a region excluding a center circle with a diameter of 70 mm had a flatness of 0.220 μm, and the substrate excluding a center circle with a diameter of 70 mm had a parallelism of 0.3 μm. The front surface experienced a change of flatness of 0.017 μm, the back surface experienced a change of flatness of 0.029 μm, and the substrate experienced a change of parallelism of 0 μm (below the detection limit). The bottom surface of the recess with a diameter of 70 mm had a flatness of 3 μm and a parallelism of 11 μm. The minimized changes of flatness and parallelism on the substrate surface proved full removal of the residual stress due to machining.

Example 5

A synthetic quartz glass substrate dimensioned 152 mm×152 mm×6.35 mm (thick) having front, back and end surfaces polished to mirror finish was prepared as a starting substrate. The starting substrate had a maximum birefringence of 1.36 nm/cm in its entirety, the front surface of the substrate in a central region of 142 mm×142 mm had a flatness of 0.217 μm, the back surface in a region excluding a central region of 142 mm×30 mm had a flatness of 0.492 μm, and the substrate excluding a central region of 152 mm×30 mm had a parallelism of 0.9 μm. Using a machining center and a diamond abrasive wheel, the starting substrate was machined at the center of its back surface to form a channel having a depth of 4.00 mm, a width of 30.00 mm and a length of 152 mm, extending parallel to the end surface.

Next, the machined substrate was immersed in a 50 wt % hydrofluoric acid aqueous solution at room temperature for 1 minute for etching.

After etching, the front surface of the substrate in a central region of 142 mm×142 mm had a flatness of 0.240 μm, the back surface in a region excluding a central region of 142 mm×30 mm had a flatness of 0.525 μm, and the substrate excluding a central region of 152 mm×30 mm had a parallelism of 0.9 μm. The front surface experienced a change of flatness of 0.023 μm, the back surface experienced a change of flatness of 0.033 μm, and the substrate experienced a change of parallelism of 0 μm (below the detection limit). The bottom surface of the channel of 152 mm×30 mm had a flatness of 4 μm and a parallelism of 10 μm. The minimized changes of flatness and parallelism on the substrate surface proved full removal of the residual stress due to machining.

Example 6

A synthetic quartz glass substrate dimensioned 200 mm×400 mm×10 mm (thick) having front, back and end surfaces polished to mirror finish was prepared as a starting substrate. The starting substrate had a maximum birefringence of 2.36 nm/cm in its entirety, the front surface of the substrate in a central region of 190 mm×390 mm had a flatness of 2.202 μm, the back surface in a central region of 190 mm×360 mm had a flatness of 3.217 μm, and the substrate excluding a central region of 190 mm×360 mm had a parallelism of 5.3 μm. Using a machining center and a diamond abrasive wheel, the starting substrate was machined on its back surface along both ends to form steps having a depth of 7.00 mm, a width of 20 mm and a length of 200 mm, extending parallel to the end surface.

Next, the machined substrate was immersed in a 50 wt % hydrofluoric acid aqueous solution at room temperature for 1 minute for etching.

After etching, the front surface of the substrate in a central region of 190 mm×390 mm had a flatness of 2.253 μm, the back surface in a central region of 190 mm×390 mm had a flatness of 3.291 μm, and the substrate in a central region of 190 mm×390 mm had a parallelism of 5.5 μm. The front surface experienced a change of flatness of 0.051 μm, the back surface experienced a change of flatness of 0.074 μm, and the substrate experienced a change of parallelism of 0.2 μm. The bottom surfaces of two steps of 200 mm×20 mm had a flatness of 9 μm and 11 μm and a parallelism of 17 μm and 19 μm, respectively. The minimized changes of flatness and parallelism on the substrate surface proved full removal of the residual stress due to machining.

Comparative Example 1

A synthetic quartz glass substrate dimensioned 100 mm×100 mm×6.35 mm (thick) having front, back and end surfaces polished to mirror finish was prepared as a starting substrate. The starting substrate had a maximum birefringence of 10.94 nm/cm in its entirety, the front surface of the substrate in a central region of 90 mm×90 mm had a flatness of 0.151 μm, the back surface in a region excluding a center circle with a diameter of 70 mm had a flatness of 0.167 μm, and the substrate excluding a center circle with a diameter of 70 mm had a parallelism of 0.3 μm. Using a machining center and a diamond abrasive wheel, the starting substrate was machined at the center of its back surface to form a circular recess having a depth of 5.32 mm and a diameter of 69.98 mm.

Next, the machined substrate was fixedly mounted on a platform. A wool felt buff having a diameter of 50 mm and a height of 30 mm adapted to rotate at 1,000 rpm was forced in contact with the bottom surface of the recess under 3,500 Pa and the side surface under 2,000 Pa. The substrate-holding platform was rotated at 10 rpm, whereby the surfaces were polished for 60 minutes to mirror finish. The recess in the glass substrate as polished had a depth of 5.35 mm with a bottom wall thickness of 1.00 mm, and a diameter of 70 mm.

After polishing, the front surface of the substrate in a central region of 90 mm×90 mm had a flatness of 0.732 μm, the back surface in a region excluding a center circle with a diameter of 70 mm had a flatness of 0.191 μm, and the substrate excluding a center circle with a diameter of 70 mm had a parallelism of 0.3 μm. The front surface experienced a change of flatness of 0.581 μm, the back surface experienced a change of flatness of 0.024 μm, and the substrate experienced a change of parallelism of 0 μm (below the detection limit). The bottom surface of the recess with a diameter of 70 mm had a flatness of 4 μm and a parallelism of 10 μm. The bottom and side surfaces of the recess had a surface roughness Ra of up to 0.25 nm.

Comparative Example 2

A synthetic quartz glass substrate dimensioned 152 mm×152 mm×6.35 mm (thick) having front, back and end surfaces polished to mirror finish was prepared as a starting substrate. The starting substrate had a maximum birefringence of 1.66 nm/cm in its entirety, the front surface of the substrate in a central region of 142 mm×142 mm had a flatness of 0.217 μm, the back surface in a region excluding a central region of 142 mm×30 mm had a flatness of 0.475 μm, and the substrate excluding a central region of 152 mm×30 mm had a parallelism of 0.9 μm. Using a machining center and a diamond abrasive wheel, the starting substrate was machined at the center of its back surface to form a channel having a depth of 5.00 mm, a width of 30.00 mm and a length of 152 mm, extending parallel to the end surface.

Next, the machined substrate was immersed in a 50 wt % hydrofluoric acid aqueous solution at room temperature for 1 minute for etching.

After etching, the front surface of the substrate in a central region of 142 mm×142 mm had a flatness of 0.749 μm, the back surface in a region excluding a central region of 142 mm×30 mm had a flatness of 0.552 μm, and the substrate excluding a central region of 152 mm×30 mm had a parallelism of 0.9 μm. The front surface experienced a change of flatness of 0.532 μm, the back surface experienced a change of flatness of 0.077 μm, and the substrate experienced a change of parallelism of 0 μm (below the detection limit). The bottom surface of the channel of 152 mm×30 mm had a flatness of 2 μm and a parallelism of 10 μm. The bottom and side surfaces of the channel had a surface roughness Ra of up to 9.21 nm.

Comparative Example 3

A synthetic quartz glass substrate dimensioned 200 mm×400 mm×10 mm (thick) having front, back and end surfaces polished to mirror finish was prepared as a starting substrate. The starting substrate had a maximum birefringence of 2.39 nm/cm in its entirety, the front surface of the substrate in a central region of 190 mm×390 mm had a flatness of 2.045 μm, the back surface in a central region of 190 mm×360 mm had a flatness of 3.302 μm, and the substrate in a central region of 190 mm×360 mm had a parallelism of 5.3 μm. Using a machining center and a diamond abrasive wheel, the starting substrate was machined on its back surface along both ends to form steps having a depth of 7.00 mm, a width of 20.00 mm and a length of 200 mm, extending parallel to the end surface.

After machining, the front surface of the substrate in a central region of 190 mm×390 mm had a flatness of 2.527 μm, the back surface in a central region of 190 mm×390 mm had a flatness of 3.453 μm, and the substrate in a central region of 190 mm×390 mm had a parallelism of 5.5 μm. The front surface experienced a change of flatness of 0.482 μm, the back surface experienced a change of flatness of 0.151 μm, and the substrate experienced a change of parallelism of 0.2 μm. The bottom surfaces of two steps of 200 mm×20 mm had a flatness of 4 μm and 3 μm and a parallelism of 10 μm and 10 μm, respectively. The bottom and side surfaces of the steps had a surface roughness Ra of up to 8.24 nm.

Japanese Patent Application No. 2010-146507 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for manufacturing an electronic grade synthetic quartz glass substrate having a recess, channel or step, comprising the steps of:
    forming a quartz glass substrate into one substrate of the group consisting of a photomask, an exposure tool component, a reticle and a nanoimprint component,
    providing the synthetic quartz glass substrate having a maximum birefringence of up to 3 nm/cm in its entirety,
    machining at least one surface of the substrate to form a recess, channel or step therein, and
    removing the residual stress due to machining by mirror finish polishing the machined surface to remove a work affected layer in the machined surface.

2. The method of claim 1 wherein the mirror finish polishing step includes polishing a bottom surface and side surfaces of the recess, channel or step to mirror finish by a working portion of a rotary polishing tool while keeping the working portion in contact with the bottom and side surfaces under independent constant pressures.

3. The method of claim 2 wherein in the mirror finish polishing step, the rotary polishing tool and the substrate are relatively moved such that the working portion may follow the profile of the recess, channel or step in the substrate.

4. The method of claim 3 wherein in the mirror finish polishing step, the rotary polishing tool is rotated about the recess or a substrate-holding platform is rotated such that the working portion may follow the profile of the recess, channel or step in the substrate.

5. The method of claim 1 wherein the mirror finish polishing step includes polishing the recess, channel or step to mirror finish by a working portion of a rotary polishing tool while keeping the working portion in contact with the recess, channel or step under a pressure of 1 to 1,000,000 Pa.

6. The method of claim 5 wherein in the mirror finish polishing step, the rotary polishing tool or a substrate-holding platform is moved along at least one straight axis such that the working portion may follow the profile of the recess, channel or step in the substrate.

7. The method of claim 1 wherein the mirror finish polishing step includes polishing a bottom surface and side surfaces of the recess, channel or step to mirror finish by a working portion of a rotary polishing tool while keeping the working portion in concurrent contact with the bottom and side surfaces under independent constant pressures.

8. The method of claim 1 wherein the substrate on its front surface has a flatness of 0.01 to 0.5 μm and a parallelism of up to 10 μm, and the substrate on its surface experiences a change of flatness of up to 0.1 μm and a change of parallelism of up to 0.3 μm before and after formation of the recess, channel or step.

9. The method of claim 1 wherein a bottom surface and side surfaces of the recess, channel or step have a surface roughness Ra of up to 1 nm after mirror finish polishing to remove the work affected layer.

10. A method for manufacturing an electronic grade synthetic quartz glass substrate having a recess, channel or step, comprising the steps of
    providing a synthetic quartz glass substrate having a maximum birefringence of up to 3 nm/cm in its entirety,
    machining at least one surface of the substrate to form a recess, channel or step therein, and
    removing the residual stress due to machining by wet etching the glass substrate with a glass etching solution to remove a work affected layer in the machined surface.

11. The method of claim 10 wherein the glass etching solution is an aqueous solution containing hydrofluoric acid or a fluoride.

12. The method of claim 10 wherein the substrate on its front surface has a flatness of 0.01 to 0.5 μm and a parallelism of up to 10 μm, and the substrate on its surface experiences a change of flatness of up to 0.1 μm and a change of parallelism of up to 0.3 μm before and after formation of the recess, channel or step.

13. The method of claim 10 wherein the glass substrate is used as a photomask, exposure tool component, reticle or nanoimprint component.

14. A method for manufacturing an electronic grade synthetic quartz glass substrate having a recess, channel or step, comprising the steps of:
    forming a quartz glass substrate into a substrate of a nanoimprint component,
    providing the synthetic quartz glass substrate having a maximum birefringence of up to 3 nm/cm in its entirety,
    machining at least one surface of the substrate to form a recess, channel or step therein, and
    removing the residual stress due to machining by mirror finish polishing the machined surface to remove a work affected layer in the machined surface,
    wherein the bottom and side surfaces of the recess, channel or step have a surface roughness of up to 0.5 after mirror finish polishing to remove the work affected layer,
    the front surface of the glass substrate experiences a change of flatness of up to 0.1 μm before and after working of the recess, channel or step in the glass substrate, and
    the back surface of the glass substrate excluding the region of recess, channel or step experiences a change of flatness of up to 0.1 μm before and after working of the recess, channel or step in the glass substrate.

15. The method of claim 14 wherein the front surface of the glass substrate has a flatness of 0.01 to 0.3 μm,
    the back surface of the glass substrate excluding the region of recess, channel or step has a flatness of 0.01 to 0.5 μm,
    the bottom surface of the recess, channel or step which has been polished to mirror finish has a flatness of 0.01 to 10 μm and a parallelism of up to 50 μm.

* * * * *